(12) United States Patent
Burger

(10) Patent No.: US 11,986,130 B2
(45) Date of Patent: May 21, 2024

(54) ADJUSTABLE SIFTING ASSEMBLY

(71) Applicant: David Burger, Sacramento, CA (US)

(72) Inventor: David Burger, Sacramento, CA (US)

( * ) Notice: Subject to any disclaimer, the term of this patent is extended or adjusted under 35 U.S.C. 154(b) by 44 days.

(21) Appl. No.: 17/894,770

(22) Filed: Aug. 24, 2022

(65) Prior Publication Data

US 2024/0065485 A1 Feb. 29, 2024

(51) Int. Cl.
*A47J 43/22* (2006.01)
*A47J 36/20* (2006.01)
*A01K 1/01* (2006.01)
*B07B 1/02* (2006.01)

(52) U.S. Cl.
CPC ............... *A47J 43/22* (2013.01); *A47J 36/20* (2013.01); *A01K 1/0114* (2013.01); *B07B 1/02* (2013.01)

(58) Field of Classification Search
CPC .. A47J 43/22; A47J 36/20; B07B 1/02; A01K 1/0114
See application file for complete search history.

(56) References Cited

U.S. PATENT DOCUMENTS

| | | | |
|---|---|---|---|
| 1,342,989 A * | 6/1920 | Dean | A47J 43/22 209/335 |
| 1,942,275 A * | 1/1934 | Bartholomew | A47J 43/22 209/358 |
| 3,329,318 A * | 7/1967 | Swett | A47J 43/22 222/189.02 |
| 4,889,619 A | 12/1989 | Lynch | |
| 5,215,196 A | 6/1993 | Valls | |
| 5,332,102 A | 7/1994 | Sennett | |
| D633,347 S | 3/2011 | Boris | |
| 8,998,022 B2 | 4/2015 | Curtis | |
| 9,795,263 B1 | 10/2017 | Perkins | |
| 2005/0189284 A1 | 9/2005 | Burfield | |
| 2014/0183105 A1 | 7/2014 | Van Wagenen | |
| 2015/0305568 A1 * | 10/2015 | Edri | A47J 43/22 222/189.02 |
| 2021/0362190 A1 | 11/2021 | Minissale | |
| 2023/0020341 A1 * | 1/2023 | Lesperance | B65D 81/262 |

FOREIGN PATENT DOCUMENTS

GB 2411368 8/2005

* cited by examiner

*Primary Examiner* — Tan Le

(57) ABSTRACT

An adjustable sifting assembly for sifting granular food material includes a sleeve that is tapered thereby facilitating the sleeve to receive a granular food material such that the granular food material is urged toward a center of the sleeve. A plurality of screens is provided and a respective one of the screens is positionable in the sleeve. Each of the screens has a plurality of openings that is integrated into the screens thereby facilitating the screen that is positioned in the sleeve to sift the granular food material. In this way the screen that is positioned in the sleeve can remove dust and debris from the granular food material. The openings in each of the screens has a unique size with respect to a respective one of the screens thereby facilitating each of the screens to sift granular food items of varying sizes.

5 Claims, 5 Drawing Sheets

ADJUSTABLE SIFTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sifting devices and more particularly pertains to a new sifting device for sifting granular food material. The device includes a sleeve which has a lip integrated into an outer wall of the sleeve and a plurality of screens. Each of the screens has a plurality of openings and the openings in each of the screens have a unique size with the other screens. A respective one of the screens is positioned in the sleeve such that the respective sleeve rests on the lip. The granular food material is poured into the sleeve and the respective screen sifts dust and debris from the granular food material.

(2) Description of Related Art Including Information Disclosed Under 37 CFR 1.97 and 1.98

The prior art relates to sifting devices including a cereal box that has a sifter integrated therein for sifting dust from breakfast cereal. The prior art discloses a popcorn sifter that includes a cylinder that has a foraminous bottom wall for sifting popcorn and a bowl for receiving the sifted popcorn. The prior art discloses a variety of sifting bowls that each includes a bowl for containing a granular food material and a sifter that is integrated into the bowl for sifting the granular food material. The prior art discloses a food sieve that includes a panel that is foraminous.

BRIEF SUMMARY OF THE INVENTION

An embodiment of the disclosure meets the needs presented above by generally comprising a sleeve that is tapered thereby facilitating the sleeve to receive a granular food material such that the granular food material is urged toward a center of the sleeve. A plurality of screens is provided and a respective one of the screens is positionable in the sleeve. Each of the screens has a plurality of openings that is integrated into the screens thereby facilitating the screen that is positioned in the sleeve to sift the granular food material. In this way the screen that is positioned in the sleeve can remove dust and debris from the granular food material. The openings in each of the screens has a unique size with respect to a respective one of the screens thereby facilitating each of the screens to sift granular food items of varying sizes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
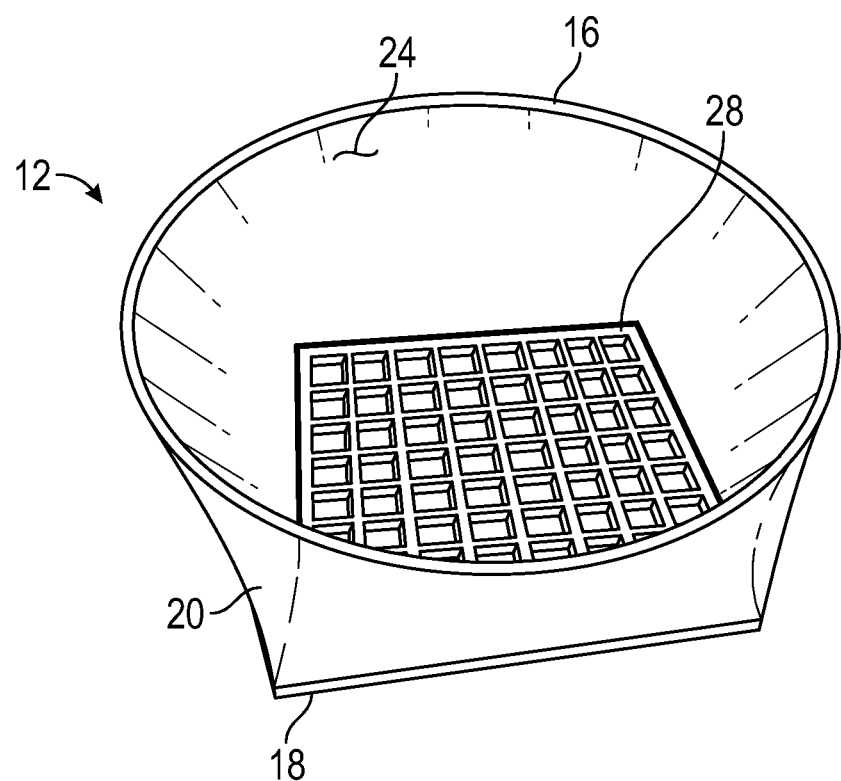
FIG. 1 is a top perspective view of an adjustable sifting assembly according to an embodiment of the disclosure.
Figure 2:
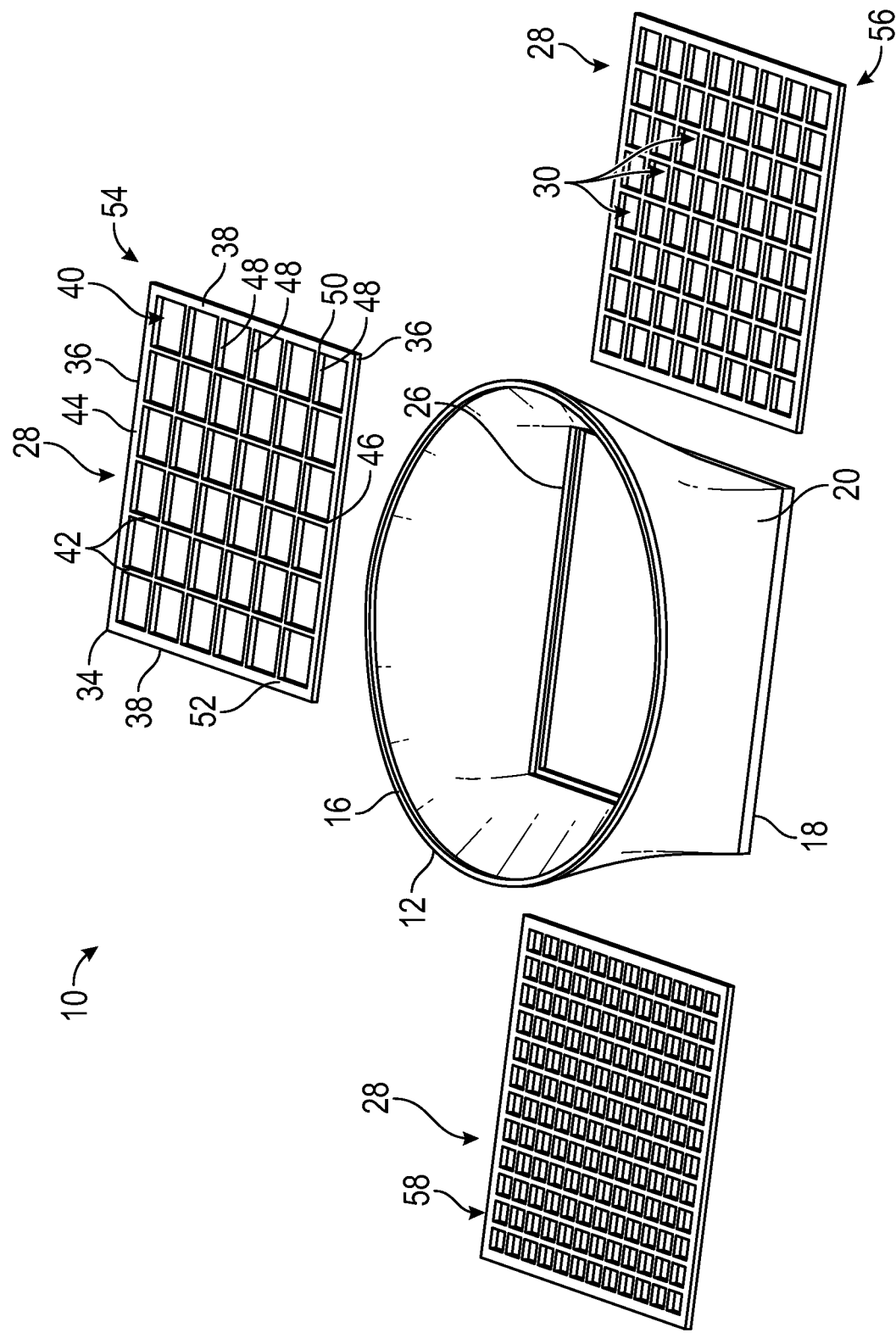
FIG. 2 is an exploded perspective view of an embodiment of the disclosure.
Figure 3:
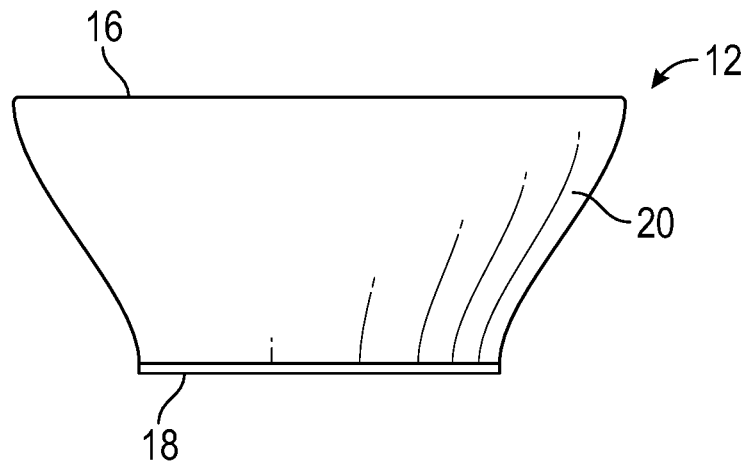
FIG. 3 is a front view of a sleeve of an embodiment of the disclosure.
Figure 4:
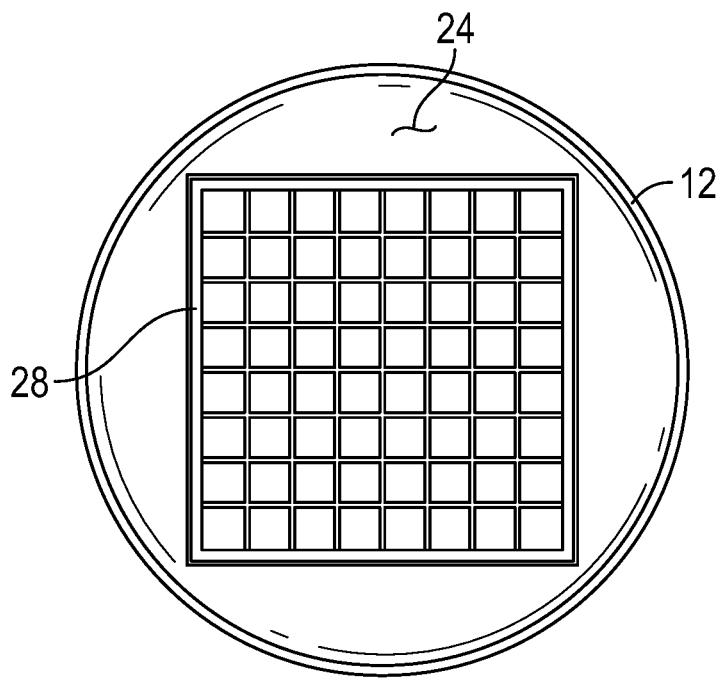
FIG. 4 is a top view of a sleeve of an embodiment of the disclosure.
Figure 5:
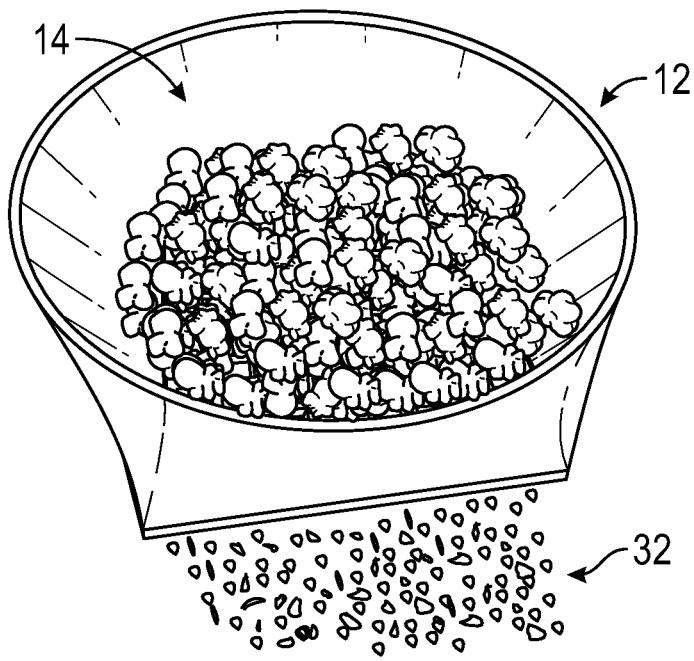
FIG. 5 is a perspective in-use view of an embodiment of the disclosure showing popcorn being sifted.
Figure 6:
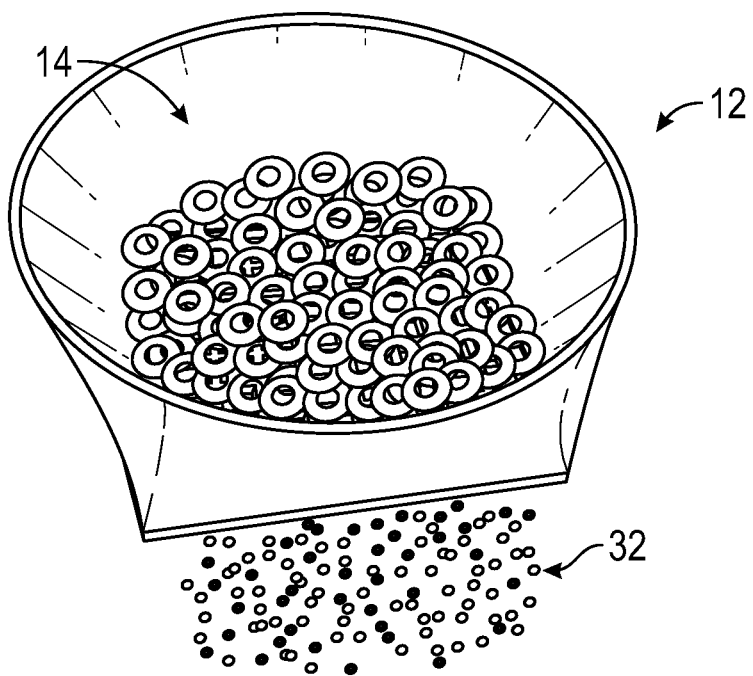
FIG. 6 is a perspective in-use view of an embodiment of the disclosure showing breakfast cereal being sifted.
Figure 7:
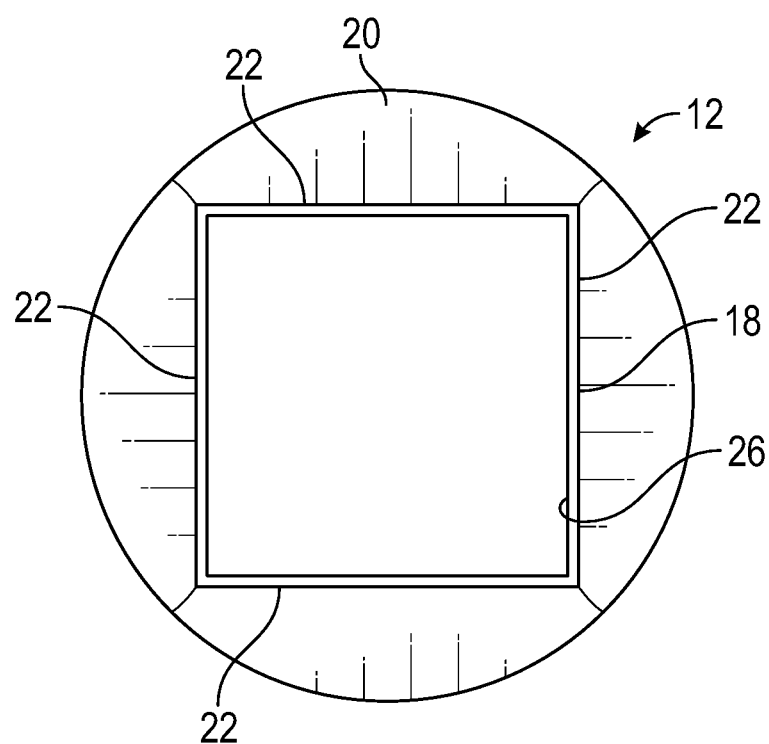
FIG. 7 is a bottom view of a sleeve of an embodiment of the disclosure.

With reference now to the drawings, and in particular to FIGS. 1 through 7 thereof, a new sifting device embodying the principles and concepts of an embodiment of the disclosure and generally designated by the reference numeral 10 will be described.

As best illustrated in FIGS. 1 through 7, the adjustable sifting assembly 10 generally comprises a sleeve 12 that is tapered thereby facilitating the sleeve 12 to receive a granular food material 14 such that the granular food material 14 is urged toward a center of the sleeve 12. The granular food material 14 may comprise breakfast cereal, popcorn or any other kind of granular food material 14. The sleeve 12 has an upper end 16, a lower end 18 and an outer wall 20 extending between the upper end 16 and the lower end 18, and each of the upper end 16 and the lower end 18 is open. The upper end 16 is continuously arcuate about a central axis of the sleeve 12 extending between the upper end 16 and the lower end 18. Additionally, the lower end 18 has a plurality of intersecting sides 22 such that the lower end 18 has a rectangular shape.

The outer wall 20 tapers inwardly between the upper end 16 and the lower end 18 such that the upper end 16 has a diameter that is greater than a diagonal of the lower end 18, and the outer wall 20 has an inner surface 24. The sleeve 12 has a lip 26 extending away from the inner surface 24 of the outer wall 20 and the lip 26 is aligned with the lower end 18. Furthermore, the lip 26 extends around each of the plurality of intersecting sides 22 of the lower end 18. The sleeve 12 and the lip 26 may each be comprised of a food grade material such that the sleeve 12 and the lip 26 are facilitated to safely be in contact with the granular food material 14.

A plurality of screens 28 is provided and a respective one of the screens 28 is positionable in the sleeve 12. Each of the screens 28 has a plurality of openings 30 is integrated into the screens 28 thereby facilitating the screen 28 that is positioned in the sleeve 12 to sift the granular food material 14. In this way the screen 28 that is positioned in the sleeve 12 can remove dust and debris 32 from the granular food material 14. Furthermore, the openings 30 in each of the screens 28 has a unique size with respect to a respective one of the screens 28 thereby facilitating each of the screens 28 to sift granular food items of varying sizes. Each of the screens 28 comprises an outer frame 34 that has a pair of first members 36 extending between and being perpendicularly oriented with a pair of second members 38 such that the outer frame 34 defines a rectangle. Additionally, the outer frame 34 has a length and a width that is slightly less than a length and a width of the lower end 18 of the sleeve 12. Each of the first members 36 and the second members 38 has an inwardly facing surface 40 that is directed toward a center of the rectangle.

Each of the screens 28 includes a plurality of primary members 42 that each has a first end 44 and a second end 46. Each of the first end 44 and the second end 46 of each of the primary members 42 is coupled to the inwardly facing surface 40 of a respective one of the first members 36. Furthermore, the primary members 42 are spaced apart from each other and are distributed along the first members 36. Each of the screens 28 includes a plurality of secondary members 48 that each has a primary end 50 and a secondary end 52. Each of the primary end 50 and the secondary end 52 of each of the secondary members 48 is coupled to the inwardly facing surface 40 of a respective one of the second members 38. Additionally, the secondary members 48 are spaced apart from each other and are distributed along the second members 38 such that a plurality of the openings 30 is defined between each of the primary members 42 and each of the secondary members 48.

The plurality of screens 28 includes a first screen 54, a second screen 56 and a third screen 58. Each of the openings 30 defined in the first screen 54 has a length and a width that is greater than the openings 30 defined in the second screen 56 and the third screen 58. Additionally, each of the openings 30 in the second screen 56 has a length and a width that is greater than the openings 30 defined in the third screen 58. Each of the first members 36 and the second members 38 of the outer frame 34 of a respective one of the first screen 54 or the second screen 56 or the third screen 58 rests on the lip 26 on the inner surface 24 of the outer wall 20 of the sleeve 12 when the respective first screen 54 or the second screen 56 or the third screen 58 is positioned in the sleeve 12. Additionally, each of the first screen 54 and the second screen 56 and the third screen 58 are comprised of a food grade material thereby facilitated to be safely in contact with the granular food material 14.

In use, a respective one of the first screen 54 or the second screen 56 or the third screen 58 is positioned on the lip 26 on the inner surface 24 of the outer wall 20 of the sleeve 12. The respective first screen 54 or second screen 56 or third screen 58 is chosen based upon the size of the granular food material 14 that is to be sifted. Furthermore, the sleeve 12 is positioned over a food container, such as a bowl for example. The granular food material 14 is poured into the sleeve 12 such that the respective first screen 54 or second screen 56 or third screen 58 sifts dust and debris 32 from the granular food material 14. In this way un-popped kernels of popcorn, for example, can be removed from popped kernels of popcorn or dust that commonly collects in the bottom of a breakfast cereal box can be removed from the breakfast cereal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable sifting assembly having a plurality of sifting screens for sifting a variety of granular food materials, said assembly comprising:
   a sleeve being tapered thereby facilitating said sleeve to receive a granular food material such that the granular food material is urged toward a center of said sleeve;
   a plurality of screens, a respective one of said screens being positionable in said sleeve, each of said screens having a plurality of openings being integrated into said screens thereby facilitating said screen that is positioned in said sleeve to sift the granular food material wherein said screen that is positioned in said sleeve is configured to remove dust and debris from the granular food material, said openings in each of said screens having a unique size with respect to a respective one of said screens thereby facilitating each of said screens to sift granular food items of varying sizes; and
   wherein said plurality of screens includes a first screen, a second screen and a third screen, each of said openings defined in said first screen having a length and a width being greater than said openings defined in said second screen and said third screen, each of said openings in said second screen having a length and a width being greater than said openings defined in said third screen.

2. The assembly according to claim 1, wherein:
said sleeve has an upper end, a lower end and an outer wall extending between said upper end and said lower end, each of said upper end and said lower end being open;
said upper end is continuously arcuate about a central axis of said sleeve extending between said upper end and said lower end;
said lower end has a plurality of intersecting sides such that said lower end has a rectangular shape;
said outer wall tapers inwardly between said upper end and said lower end such that said upper end has a diameter being greater than a diagonal of said lower end;
said outer wall having an inner surface; and
said sleeve has a lip extending away from said inner surface of said outer wall, said lip being aligned with said lower end, said lip extending around each of said plurality of intersecting sides of said lower end.

3. The assembly according to claim 1, wherein each of said screens comprises:
an outer frame having a pair of first members extending between and being perpendicularly oriented with a pair of second members such that said outer frame defines a rectangle, each of said first members and said second members having an inwardly facing surface being directed toward a center of said rectangle;
a plurality of primary members, each of said primary members having a first end and a second end, each of said first end and said second end of each of said primary members being coupled to said inwardly facing surface of a respective one of said first members, said primary members being spaced apart from each other and being distributed along said first members; and
a plurality of secondary members, each of said secondary members having a primary end and a secondary end, each of said primary end and said secondary end of each of said secondary members being coupled to said inwardly facing surface of a respective one of said second members, said secondary members being spaced apart from each other and being distributed along said second members such that a plurality of openings is defined between each of said primary members and each of said secondary members.

4. The assembly according to claim 1, wherein:
said sleeve has an outer wall, said outer wall having an inner surface;
said sleeve having a lip extending away from said inner surface of said outer wall; and
each of said first members and said second members of said outer frame of a respective one of said first screen or said second screen or said third screen rests on said lip on said inner surface of said outer wall of said sleeve when said respective first screen or said second screen or said third screen is positioned in said sleeve.

5. An adjustable sifting assembly having a plurality of sifting screens for sifting a variety of granular food materials, said assembly comprising:
a sleeve being tapered thereby facilitating said sleeve to receive a granular food material such that the granular food material is urged toward a center of said sleeve, said sleeve having an upper end, a lower end and an outer wall extending between said upper end and said lower end, each of said upper end and said lower end being open, said upper end being continuously arcuate about a central axis of said sleeve extending between said upper end and said lower end, said lower end having a plurality of intersecting sides such that said lower end has a rectangular shape, said outer wall tapering inwardly between said upper end and said lower end such that said upper end has a diameter being greater than a diagonal of said lower end, said outer wall having an inner surface, said sleeve having a lip extending away from said inner surface of said outer wall, said lip being aligned with said lower end, said lip extending around each of said plurality of intersecting sides of said lower end; and
a plurality of screens, a respective one of said screens being positionable in said sleeve, each of said screens having a plurality of openings being integrated into said screens thereby facilitating said screen that is positioned in said sleeve to sift the granular food material wherein said screen that is positioned in said sleeve is configured to remove dust and debris from the granular food material, said openings in each of said screens having a unique size with respect to a respective one of said screens thereby facilitating each of said screens to sift granular food items of varying sizes, each of said screens comprising:
an outer frame having a pair of first members extending between and being perpendicularly oriented with a pair of second members such that said outer frame defines a rectangle, each of said first members and said second members having an inwardly facing surface being directed toward a center of said rectangle;
a plurality of primary members, each of said primary members having a first end and a second end, each of said first end and said second end of each of said primary members being coupled to said inwardly facing surface of a respective one of said first members, said primary members being spaced apart from each other and being distributed along said first members; and
a plurality of secondary members, each of said secondary members having a primary end and a secondary end, each of said primary end and said secondary end of each of said secondary members being coupled to said inwardly facing surface of a respective one of said second members, said secondary members being spaced apart from each other and being distributed along said second members such that a plurality of openings is defined between each of said primary members and each of said secondary members;
wherein said plurality of screens includes a first screen, a second screen and a third screen, each of said openings defined in said first screen having a length and a width being greater than said openings defined in said second screen and said third screen, each of said openings in said second screen having a length and a width being greater than said openings defined in said third screen; and
wherein each of said first members and said second members of said outer frame of a respective one of said first screen or said second screen or said third screen rests on said lip on said inner surface of said outer wall of said sleeve when said respective first screen or said second screen or said third screen is positioned in said sleeve.

\* \* \* \* \*